United States Patent
Terry et al.

(10) Patent No.: US 12,401,232 B2
(45) Date of Patent: Aug. 26, 2025

(54) WIRELESS POWER SYSTEMS WITH FREQUENCY-SHIFT-KEYING COMMUNICATIONS

(71) Applicant: Apple Inc., Cupertino, CA (US)

(72) Inventors: Stephen C Terry, San Jose, CA (US); Zaid A AbuKhalaf, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 595 days.

(21) Appl. No.: 17/883,401

(22) Filed: Aug. 8, 2022

(65) Prior Publication Data

US 2023/0420998 A1    Dec. 28, 2023

Related U.S. Application Data

(60) Provisional application No. 63/355,046, filed on Jun. 23, 2022.

(51) Int. Cl.
*H02J 50/80* (2016.01)
*H02J 50/12* (2016.01)
*H04B 10/61* (2013.01)

(52) U.S. Cl.
CPC .............. *H02J 50/80* (2016.02); *H02J 50/12* (2016.02); *H04B 10/612* (2013.01)

(58) Field of Classification Search
USPC ....................................................... 320/108
See application file for complete search history.

(56) References Cited

U.S. PATENT DOCUMENTS

| | | |
|---|---|---|
| 10,700,742 B1 | 6/2020 | Martchovsky |
| 2004/0081251 A1 | 4/2004 | Kons |
| 2006/0239334 A1 | 10/2006 | Kwon et al. |
| 2012/0314783 A1 | 12/2012 | Baril et al. |
| 2018/0167238 A1 | 6/2018 | Kim et al. |
| 2020/0076248 A1* | 3/2020 | Ye .................. H02J 50/10 |

(Continued)

FOREIGN PATENT DOCUMENTS

| | | |
|---|---|---|
| WO | 2019055152 A1 | 3/2019 |
| WO | 2021105282 A1 | 6/2021 |
| WO | 2022236343 A1 | 11/2022 |

OTHER PUBLICATIONS

M. A. Adeeb et al., An Inductive Link-Based Wireless Power Transfer System for Biomedical Applications, Active and Passive Electronic Components, Mar. 5, 2012, pp. 1-11, vol. 2012, Article ID 879294, Hindawi Publishing Corporation.

(Continued)

*Primary Examiner* — Bryce M Aisaka
(74) *Attorney, Agent, or Firm* — Treyz Law Group, P.C.; Joseph F. Guihan

(57) ABSTRACT

A wireless power system has a wireless power transmitting device and a wireless power receiving device. The devices in the wireless power system may communicate using in-band communication. The wireless power transmitting device may transmit data to the wireless power receiving device using frequency-shift keying (FSK) modulation. The receiving device may not be aware of the transmission rate of the FSK data. The FSK decoder may identify an actual transmission rate of the incoming bits and decode the wireless power signals into subsequent bits using the actual transmission rate.

20 Claims, 5 Drawing Sheets

(56) References Cited

U.S. PATENT DOCUMENTS

| | | |
|---|---|---|
| 2020/0220392 A1 | 7/2020 | Pan et al. |
| 2020/0295605 A1 | 9/2020 | Chuang et al. |
| 2021/0320745 A1 | 10/2021 | Kim et al. |
| 2021/0409073 A1 | 12/2021 | Louis et al. |

OTHER PUBLICATIONS

Kennedy et al., A High-Q Resonant Inductive Link Transmit Modulator/Driver for Enhanced Power and FSK/PSK Data Transfer Using Adaptive-Predictive Phase-Continuous Switching Fractional-Capacitance Tuning, 2019 IEEE International Solid-State Circuits Conference, Feb. 20, 2019, pp. 444-446, IEEE, San Francisco, CA, USA.

* cited by examiner

WIRELESS POWER SYSTEMS WITH FREQUENCY-SHIFT-KEYING COMMUNICATIONS

This application claims priority to U.S. provisional patent application No. 63/355,046, filed Jun. 23, 2022, which is hereby incorporated by reference herein in its entirety.

FIELD

This relates generally to power systems, and, more particularly, to wireless power systems for charging electronic devices.

BACKGROUND

In a wireless power system (sometimes called a wireless charging system), a wireless power transmitting device such as a charging mat or charging puck wirelessly transmits power to a wireless power receiving device such as a portable electronic device. The wireless power receiving device has a coil and rectifier circuitry. The coil receives alternating-current wireless power signals from the wireless power transmitting device. The rectifier circuitry converts the received signals into direct current power. During wireless power transfer, the wireless power transmitting and receiving devices may communicate packets of data with one another.

SUMMARY

An electronic device may include wireless power transmission circuitry having a coil operable to transfer wireless power signals with an additional wireless charging device and a frequency-shift keying decoder operable to decode data received from the additional wireless charging device during wireless power transmission. The data may be represented using frequency-shift keying characteristics encoded into to the wireless power signal by the additional wireless charging device, the data may be encoded at an actual transmission rate, selected by the additional wireless charging device, amongst a plurality of permitted transmission rates, and the frequency-shift keying decoder may be configured to identify the actual transmission rate using information in the encoded data.

DETAILED DESCRIPTION

Figure 1:
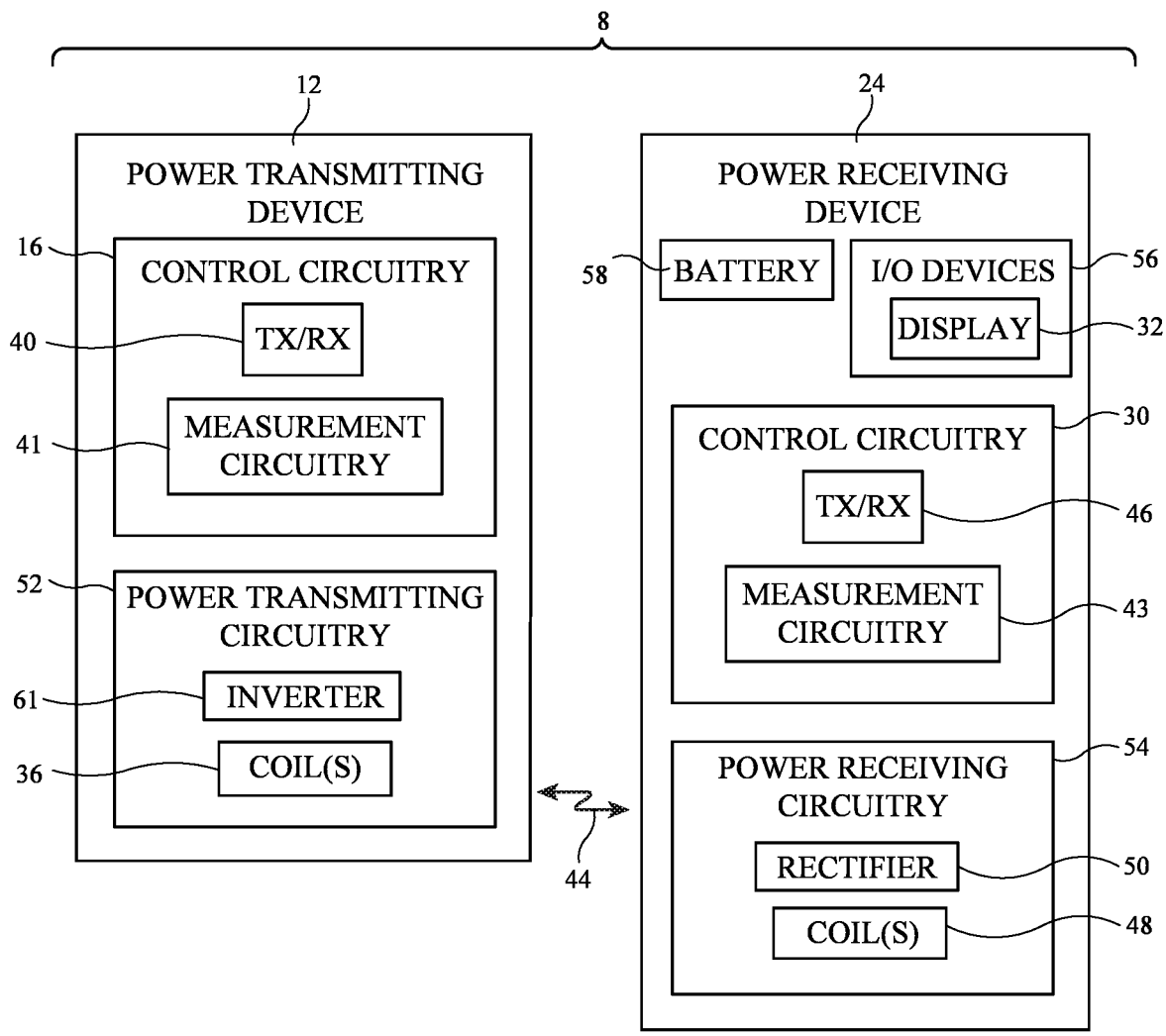
FIG. 1 is a schematic diagram of an illustrative wireless power system that includes a wireless power transmitting device and a wireless power receiving device in accordance with some embodiments.

A wireless power system has a wireless power transmitting device that transmits power wirelessly to a wireless power receiving device. The wireless power transmitting device may be a device such as a wireless charging mat, wireless charging puck, wireless charging stand, wireless charging table, for example. The wireless power transmitting device may be a stand-alone device or built into other electronic devices such as a laptop computer, tablet computer, or cellular telephone, for example. The wireless power transmitting device has one or more coils that are used in transmitting wireless power to one or more wireless power receiving coils of the wireless power receiving device. The wireless power receiving device may be a device such as a cellular telephone, watch, media player, tablet computer, pair of earbuds, remote control, laptop computer, electronic pencil, stylus, or other battery-powered electronic device, for example.

During wireless power transfer operation, the wireless power transmitting device supplies alternating-current signals to its one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Some wireless power transmitting devices use frequency-shift keying (FSK) modulation to transmit in-band data to wireless power receiving devices. Power is conveyed wirelessly from the wireless power transmitting device to the wireless power receiving device during these FSK transmissions. In FSK communication, the data transmitter, which is the wireless power transmitter in some examples, modulates the power transmission frequency or phase of the wireless power signals. The data receiver, which is also the wireless power transmitting device in some examples, rectifies the incoming signal to produce DC power, and at the same time, monitors the frequency of the AC signal passing through the coil and uses FSK demodulation circuitry to decode the transmitted in-band data from the received signals.

A data transmitter may elect one of at least several possible data transmission rates, sometimes referred to as a baud rate. Transmission rate selection may depend on power transmission frequencies, communications channel conditions, wireless power transfer protocol requirements, or other system operating conditions. Notably, the particular transmission rate used by the data transmitter (e.g., wireless power transmitting device) may not be known a priori to the data receiver (e.g., wireless power receiving device) that is to decode the incoming data.

In some embodiments, to account for multiple possible transmission rates, an FSK decoder in the wireless power receiving device performs multiple decoding operations at multiple transmission rates and compares the decoded data against checksum information contained in the transmitted data to identify the currently-used transmission rate. In some embodiments, an FSK decoder identifies the in-use transmission rate by decoding and identifying a known preamble in the incoming signal path. The known preamble may be one that is agreed upon by the data transmitter and receiver (e.g., wireless power transmitting and receiving devices) during handshake or according to a protocol such as a published standard specification.

An illustrative wireless power system is shown in FIG. 1. Wireless power system 8 includes exemplary wireless power transmitting device 12 and exemplary wireless power receiving device 24. Wireless power transmitting device 12 includes control circuitry 16. Wireless power receiving device 24 includes control circuitry 30. These control circuitries control the operation of system 8 and may each include microprocessors, power management circuits, digital signal processors, microcontrollers, and/or application-specific integrated circuits that implement desired wireless power transfer and communications features of devices 12 and 24. For example, control circuitry 16 in wireless power transmitting device 12 may control inverter and wireless power coil output to provide wireless power and data communication signals, while control circuitry 30 in wireless power receiving device 24 may control rectifier and FSK decoder features to obtain incoming power and data.

Control circuitry in system 8 may include dedicated hardware (e.g., custom silicon or application specific integrated circuitry), firmware (e.g., programmable chips executing computer-executable code), and/or software (e.g., microprocessors executing computer-executable code). Code for performing operations in system 8 and other data is stored on non-transitory computer readable storage media (e.g., tangible computer readable storage media) in control circuitry 8. Code is sometimes referred to as computer-executable program instructions, or computer-executable instructions. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The portions of control circuitries 16 and 30 that are used to process code may be application-specific integrated circuit(s), microprocessor(s), central processing unit(s), or the like.

During operation, a controller in control circuitry 16 uses power transmitting circuitry 52 to transmit wireless power to power receiving circuitry 54 of device 24. Power transmitting circuitry 52 and/or wireless power receiving circuitry 54 may sometimes be referred to as wireless power transmission circuitry. Power transmitting circuitry 52 may have switching circuitry (e.g., inverter circuitry 61 formed from transistors or other switches) that is turned on and off based on control signals provided by control circuitry 16 to create AC current signals through one or more wireless power transmitting coils such as wireless power transmitting coil or coils 36. In some arrangements, device 12 has a single coil. In some arrangements, device 12 has multiple coils. Coil(s) 36, when driven by the switches of power transmitting circuitry 52, produces wireless power signals 44 in the form of electromagnetic fields. These fields, sometimes referred to as magnetic flux, received by coil(s) 48 in power receiving device 24 are rectified using rectifier circuitry 50 to charge battery 58 and/or to power the components of wireless power receiving device 24, such as display 32. In some examples, rectifier circuitry 50 contains rectifying components such as synchronous rectification metal-oxide-semiconductor transistors arranged in a bridge network.

Wireless power receiving device 24 may include input-output devices 56. The input-output devices may include input devices for gathering user input and/or making environmental measurements and may include output devices (such as display 32) for providing a user with output (e.g., displayed content, audio content, haptic output, etc.). Wireless power transmitting device 12 may also optionally have one or more input-output devices.

Wireless power transmitting device 12 and wireless power receiving device 24 communicate wirelessly using in-band or out-of-band communications to maintain wireless power transfer operations, such as for power feedback control. Exemplary data transfer circuitry may produce wireless data transmission signals and exemplary data transfer circuitry 46 may receive and decode the data transmission signals.

It is noted that exemplary wireless power transmitting device 12 includes measurement circuitry 41 that is used for measuring characteristics of coil(s) 36, such as voltage and current, that facilitate operations such as foreign object detection. Exemplary wireless power receiving device 24 also includes measurement circuitry 43 for making similar measurements that facilitate operations such as measuring amounts of received power.

Figure 2:
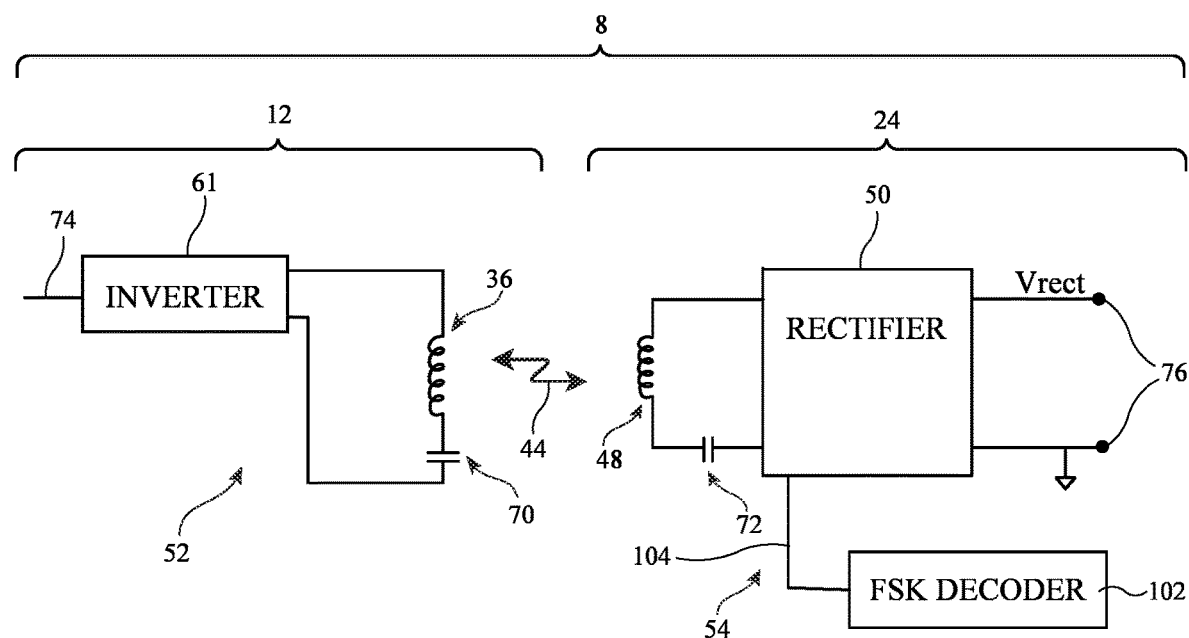
FIG. 2 is a circuit diagram of illustrative wireless power transmitting and receiving circuitry in accordance with some embodiments.

FIG. 2 illustrates a circuit diagram of exemplary wireless power transfer circuitry 52 of wireless power transmitting device 12 in system 8. Wireless power transfer circuitry 52 includes one or more inverter(s) 61 that produces wireless power signals that are transmitted through an output circuit including one or more coils 36 and capacitive element(s) 70. In multi-coil transmitters, device 12 may include a single inverter 61 connected to multiple coils or may include multiple inverters 61 each powering a coil. In single-coil examples, inverter 61 is coupled to coil 36.

During operation, control circuitry 16 provides control signals for the switches of inverter(s) 61 at control input 74. The application of drive signals using inverter(s) 61 causes the output circuits formed from selected coils 36 and capacitive element(s) 70 to produce alternating-current electromagnetic fields 44 that are received by wireless power receiving circuitry 54 using a wireless power receiving circuit formed from one or more coils 48 and one or more capacitive element(s) 72 in wireless power receiving device 24. Rectifier circuitry 50 is coupled to one or more coils 48 and converts received power from AC to DC and supplies a corresponding direct current output voltage Vrect across rectifier output terminals 76 for powering loads, such as battery 58 and/or display 32.

Exemplary system 8 utilizes in-band communications with coils 36 and 48 to transmit information between devices 12 and 24. In some embodiments, wireless power transmitting device 12 uses frequency-shift keying (FSK) techniques to transmit in-band data from device 12 to wireless power receiving device 24, while wireless power receiving device 24 uses amplitude-shift keying (ASK) techniques to transmit in-band data from device 24 to device 12. Power is transferred wirelessly from device 12 to device 24 during these FSK and ASK transmissions. While power transmitting circuitry 52 is driving AC signals into coil(s) 36 to produce signals 44 at the power transmission frequency, wireless transceiver circuitry 40 uses FSK modulation to modulate the power transmission frequency of the driving AC signals to impart FSK communication into signals 44. At receiving device 24, FSK decoding circuitry 102 (sometimes referred to as FSK decoder 102) monitors the frequency of the AC signal passing through coil(s) 48 and uses FSK demodulation to extract (decode) the transmitted in-band data from signals 44. This approach allows packets of data bits to be transmitted in-band from device 12 to device 24, with coils 36 and 48, during wireless power transfer using the same coils. In some examples FSK decoder 102 is part of wireless transceiver circuitry 46 of FIG. 1.

In-band communications in the direction from wireless power receiving device 24 to device 12 may use ASK modulation and demodulation techniques. During wireless power transfer, circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the resulting amplitude of the AC signal passing through coil(s) 36. Wireless transceiver circuitry 40 monitors the amplitude of this AC signal and, using ASK demodulation techniques, extracts the data that is transmitted by wireless transceiver circuitry 46. This approach allows packets of data bits to be transmitted in-band from device 24 to device 12 with coils 48 and 36 while power is simultaneously being wirelessly conveyed from device 12 to device 24 using the same coils.

The foregoing example of FSK and ASK modulation represents one possible implementation of in-band communications. It is noted that other permutations are possible, and that devices in a system such as wireless power transfer system 8 may be designed to operate on FSK or ASK principles.

The foregoing discussions of FSK and ASK modulation contemplates the transfer of information useful for controlling wireless power transfer, such as feedback information regarding received power, battery states of charge, and so forth. Out of an abundance of caution, it is noted that to the extent that any implementation of this communication technology involves the use of device identification information (or more generally, personally identifiable information) for purposes of wireless charging, implementers should follow privacy policies and practices that are generally recognized as meeting or exceeding industry or governmental requirements for maintaining the privacy of users. For example, identification information data should be managed and handled to minimize risks of unintentional or unauthorized access or use, and the nature of authorized use should be clearly indicated to users. Where possible, such identification information may be abstracted, so that the resulting identification is not globally unique but still sufficient to facilitate communication under reasonable device usage scenarios.

It has been described that power may be simultaneously conveyed between devices while using in-band communication for data transmission between the devices. In other words, in some examples in-band communications may rely on modulation of the power transmission signal (e.g., modulating the power transmission frequency or modulating amplitude of a signal at the power transmission frequency). However, it should be noted that in-band communication may occur between devices before the devices agree upon a power transfer rate, power transmission frequency, etc. After initial detection and inductive coupling, devices may go through a handshake process to determine compatibility, negotiate power transfer frequency, negotiate power transfer rate, etc. During this process, in-band communication may involve FSK and/or ASK modulation of an underlying signal that provides limited power wirelessly. This is advantageous as it allows the devices to complete the handshake process even if the power receiving device has insufficient remaining battery power to remain powered on. This transmission of wireless power during in-band communications may occur during the handshake process even if, ultimately, the negotiations between the devices result in no sustained transmission of wireless power (e.g., even if the devices do not enter a dedicated power transfer phase).

The aforementioned FSK and ASK modulation and demodulation techniques may be used to transmit data packets between any two devices within system 8. Each data packet may include a plurality of data bits. These bits may be grouped into bytes.

FSK decoder 102 in power receiving circuitry 54 decodes FSK communications received from wireless power transmitting device 12 at coil 48 of wireless power receiving device 24.

During FSK modulation, power transmitting device 12 may switch its inverter output frequency between a first operating frequency (e.g., unmodulated operating frequency $f_{op}$) and a second operating frequency (e.g., modulated operating frequency $f_{mod}$). The difference between the two frequencies has both a polarity (indicating whether the difference between $f_{mod}$ and $f_{op}$ is positive or negative) and a depth (indicating the magnitude of the difference between $f_{mod}$ and $f_{op}$).

Using the unmodulated operating frequency and the selected modulated operating frequency, the power transmitter may transmit bits using FSK modulation. The power transmitter may use a bit encoding scheme to transmit the bits using FSK modulation. In one illustrative example, the power transmitter may use a differential bi-phase encoding scheme to modulate data bits using the power signal. This type of bi-phase encoding scheme is shown in FIG. 3.

Figure 3:
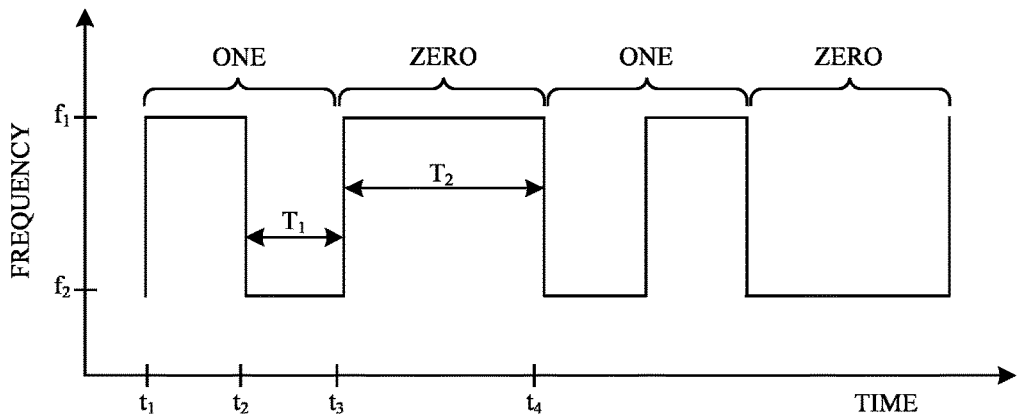
FIG. 3 is a diagram showing an illustrative frequency-shift keying (FSK) modulation bit encoding scheme in accordance with some embodiments.

FIG. 3 shows the power signal frequency over time during FSK modulation. The power signal frequency transitions between frequencies $f_1$ and $f_2$ to encode bits. Frequencies $f_1$ and $f_2$ may be equal to $f_{op}$ and $f_{mod}$ as discussed previously, with either $f_{op}$ or $f_{mod}$ being the higher of the two frequencies. As shown, in the encoding scheme of FIG. 3, a transition between the two frequencies occurs at the start of each bit. To encode a 'one' bit, there are two transitions in the power signal frequency. To encode a 'zero' bit, there is one transition in the power signal frequency.

For example, at $t_1$ the operating frequency (power signal frequency) transitions from $f_2$ to $f_1$. This indicates the start of encoding the one bit. The operating frequency may remain at $f_1$ for a given number of cycles of the power signal (e.g., 256 cycles) then transition back to $f_2$ at $t_2$. The operating frequency remains at $f_2$ for the given number of cycles. At $t_3$, the encoding of the one bit is complete. At $t_3$, the operating frequency (power signal frequency) transitions from $f_2$ to $f_1$. This indicates the start of encoding the zero bit. The operating frequency may remain at $f_1$ for a given number of cycles (e.g., 512 cycles) then transition back to $f_2$ at $t_4$. At $t_4$, the encoding of the zero bit is complete.

Each bit (either a 'one' or 'zero') is transmitted over the same number of cycles (e.g., duration $T_2$ in FIG. 3). This number of cycles may sometimes be referred to as a bit period. For a zero bit, the operating frequency transitions once at the beginning of the bit period and then remains at the same operating frequency for the entire bit period ($T_2$). For a one bit, the operating frequency transitions once at the beginning of the bit period and again halfway through transmission of the bit. During encoding of a one bit, the operating frequency is therefore at both frequencies $f_1$ and $f_2$ for an equal number of cycles $T_1$ that is half of $T_2$.

During encoding of bits using the differential bi-phase encoding scheme of FIG. 3, the frequency remains constant for either a number of cycles $T_2$ or $T_1$ before transitioning to the other frequency. $T_1$ is half of $T_2$. These periods of time where the frequency is constant may be referred to as modulation states. The modulation states are used to convey bits using the bit encoding scheme.

The bit period has an associated transmission rate (e.g., the number of bits transmitted per second, sometimes referred to as bit rate). FSK communication signals received by wireless power receiving device 24 may sometimes have different transmission rates. The transmission rates for FSK communications may be impacted by the frequency of the carrier signal and the number of cycles in each bit period. For example, a first power transmitting device may transmit wireless power using a carrier signal at a first frequency whereas a second, different power transmitting device may transmit wireless power using a carrier signal at a second, different frequency. Additionally, different FSK modulation schemes may use different numbers of cycles of the power signal during each bit period.

As one example, the duration of each bit period (e.g., $T_2$ in FIG. 3) may be 512 cycles total. $T_1$ is therefore 256 cycles. For encoding a zero bit, the operating frequency transitions and then is held constant for 512 cycles. For encoding a one bit, the operating frequency transitions, is held constant for 256 cycles, transitions again, and is then again held constant for 256 cycles. The modulation states (where the operating frequency is constant) are therefore either 512 cycles or 256 cycles.

As another example, the duration of each bit period (e.g., $T_2$ in FIG. 3) may be 128 cycles total. $T_1$ is therefore 64 cycles. For encoding a zero bit, the operating frequency transitions and then is held constant for 128 cycles. For encoding a one bit, the operating frequency transitions, is held constant for 64 cycles, transitions again, and is then again held constant for 64 cycles. The modulation states (where the operating frequency is constant) are therefore either 128 cycles or 64 cycles.

The duration of each bit period may therefore vary depending on one or more of the type of power transmitting device transmitting wireless power signals, the communications protocol used by the wireless power transmitting device, a negotiated power transmission frequency, etc. It is desirable for FSK decoder 102 to be able to demodulate FSK communication signals with different bit periods (and corresponding different transmission rates), particularly when the transmission rate used by the transmitter is unknown ahead of time to the decoder.

Figure 4:
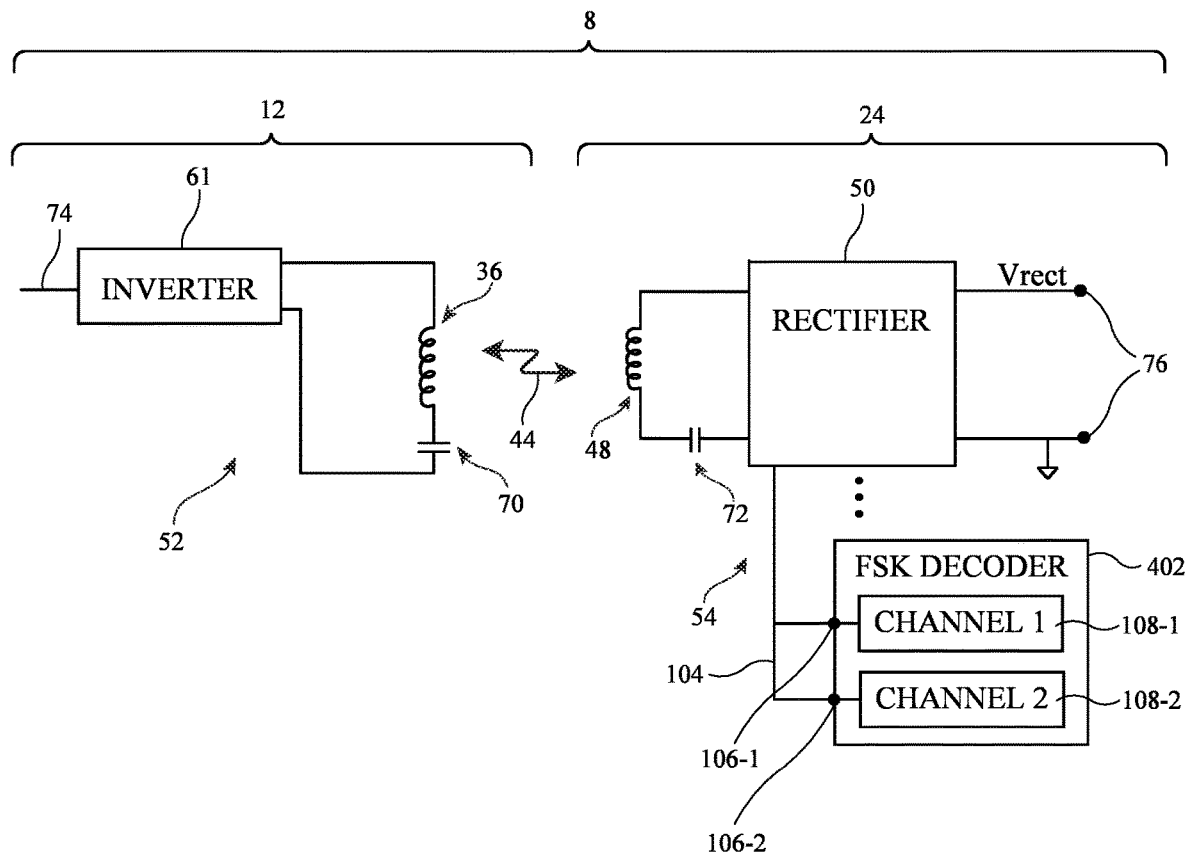
FIG. 4 is a circuit diagram of illustrative wireless power transmitting and receiving circuitry that includes a multi-channel frequency-shift keying decoder in accordance with some embodiments.

FIG. 4 illustrates an exemplary FSK decoder 402 (which may be an illustrative embodiment for FSK decoder 102 in FIG. 2) having multiple demodulation channels in accordance with some embodiments. As shown in FIG. 4, FSK decoder 402 may include multiple inputs such as input 106-1 and input 106-2. A common signal 104 (having a frequency equal to the frequency of wireless power signals received at coil 48) may be provided to both inputs.

Input 106-1 may be an input to a first channel 108-1 within FSK decoder 402 that decodes the incoming signals using a first transmission rate. Input 106-2 may be an input to a second channel 108-2 within FSK decoder 402 that decodes the incoming signals using a second transmission rate. The decoder channels 108 may have duplicate logic/circuitry such that the incoming signals are decoded in parallel in each channel. The decoder channels may sometimes themselves be referred to as respective FSK decoders.

Figure 5:
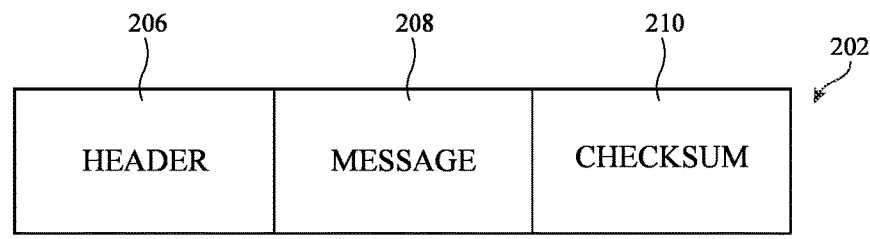
FIG. 5 is a diagram of an illustrative byte with a checksum in accordance with some embodiments.

As shown in FIG. 5, each byte 202 transmitted by wireless power transmitting device 12 may have a header 206, a message (sometimes referred to as payload) 208, and/or a checksum 210. Each portion of byte 202 may include any desired number of bits (e.g., one or more bits). Each channel in FSK decoder 402 in FIG. 4 may decode bits in the byte (e.g., from a byte header and/or payload) and use the decoded bits to perform a checksum operation. The checksum operation may produce an output that is compared to the received value for checksum 210. If the output of the checksum operation matches checksum 210, the checksum may be considered valid/true and FSK decoder 402 considers the byte to be successfully transmitted without any bit errors. If the output of the checksum operation does not match checksum 210, the checksum may be considered invalid/false and FSK decoder 402 considers the byte to have one or more bit errors.

Consider the example where the actual transmission rate is equal to the first transmission rate (used by first channel 108-1 but not second channel 108-2). In this case, each byte received by first channel 108-1 will have a valid checksum indicating that the byte was received without error. The data decoded by first channel 108-1 is therefore output as valid in-band communication data to downstream circuitry. Second channel 108-2, meanwhile, will repeatedly have an invalid checksum indicating that the byte was received with one or more errors. The data decoded by second channel 108-2 will therefore be discarded.

Consider the example where the actual transmission rate is equal to the second transmission rate (used by second channel 108-2 but not first channel 108-1). In this case, each byte received by second channel 108-2 will have a valid checksum indicating that the byte was received without error. The data decoded by second channel 108-2 is therefore output as valid in-band communication data to downstream circuitry. First channel 108-1, meanwhile, will repeatedly have an invalid checksum indicating that the byte was received with one or more errors. The data decoded by first channel 108-1 will therefore be discarded.

The example in FIG. 5 of the FSK decoder having two inputs for two corresponding decoder channels (that operate at two different transmission rates) is merely illustrative. In general, the FSK decoder may have any desired number of inputs. Each input receives a common signal 104 (that has the same frequency as the received wireless power signals). Each input is provided to an associated decoder channel that operates at a different transmission rate. If the incoming FSK communications have a transmission rate that matches one of the decoder channels, the FSK decoder 402 will accurately decode the FSK communications using the appropriate decoder channel (while discarding the extraneous results of the other decoder channels).

It is noted that signal 104 (sometimes referred to as AC signal 104, input signal 104, etc.) may have a frequency that is equal to the frequency of the wireless power signals received by coil 48. In some cases, signal 104 may come from coil 48 directly (e.g., FSK decoder 402 may be coupled directly to coil 48 and therefore receives an analog signal 104 from coil 48). As another example, signal 104 may come from rectifier 50 (e.g., signal 104 may be an analog signal from rectifier 50). Signal 104 may sometimes be a digital signal that has the same frequency as the wireless power signals received by coil 48. For example, rectifier 50 may include one or more comparators with a digital output that varies between two states at the same frequency as the wireless power signals received by coil 48. This signal may be provided to FSK decoder 402 for FSK decoding operations.

Figure 6:
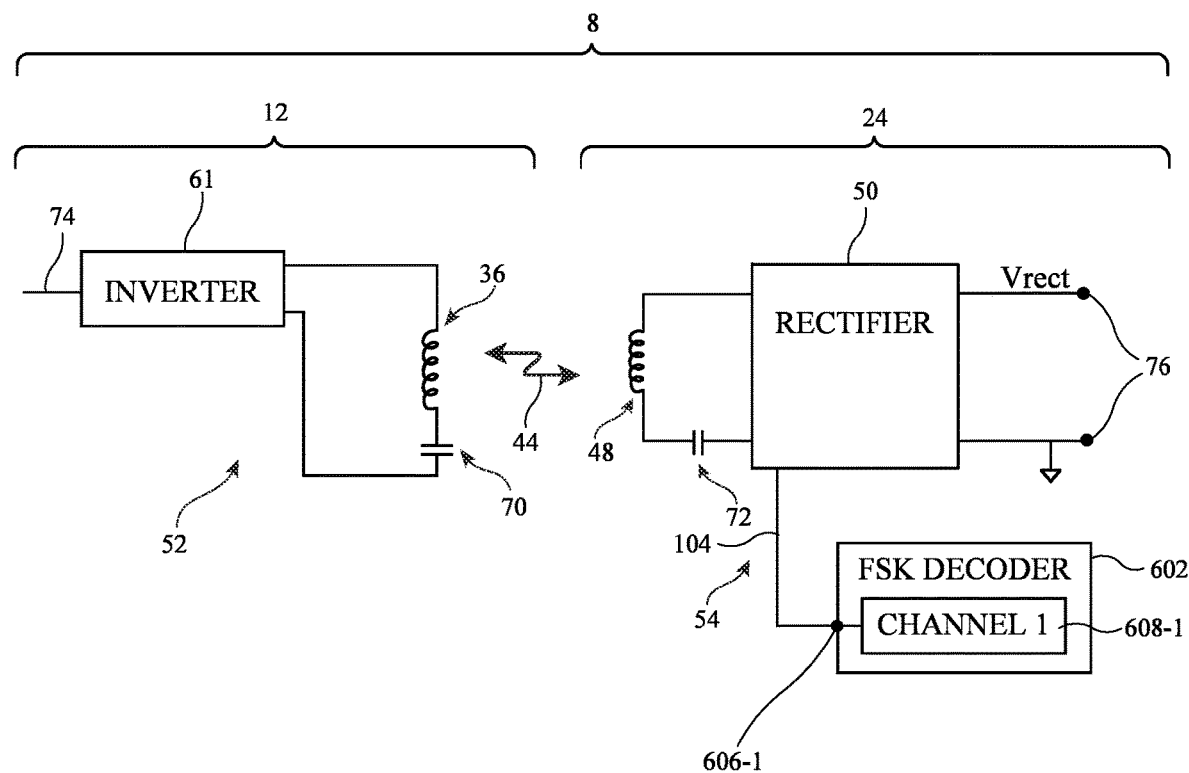
FIG. 6 is a circuit diagram of illustrative wireless power transmitting and receiving circuitry that includes a single-channel frequency-shift keying decoder in accordance with some embodiments.

FIG. 6 illustrates an exemplary FSK decoder 602 (which may be an illustrative embodiment for FSK decoder 102 in FIG. 2) having a single demodulation channel in accordance with some embodiments. As shown in FIG. 6, FSK decoder 602 may include a single input such as input 606-1. Input 606-1 receives signal 104 (having a frequency equal to the frequency of the wireless power signals received at coil 48).

FSK decoder 602 may decode data that is represented using FSK characteristics based on a single transmission rate. The data may be encoded at an actual transmission rate amongst a plurality of permitted transmission rates (e.g., selected by wireless power transmitting device 12). FSK decoder 602 may be configured to identify the actual transmission rate using information encoded in the data.

Input 606-1 may be an input to a first channel 608-1 within FSK decoder 602. Channel 608-1 may decode using different transmission rates at different times. For example, there may be first, second, and third permitted transmission rates for received FSK data. FSK decoder 602 is therefore capable of decoding incoming signals using the first transmission rate at a first time, decoding incoming signals using the second transmission rate at a second time subsequent to the first time, and decoding incoming signals using the third transmission rate at a third time subsequent to the second time.

Figure 7:
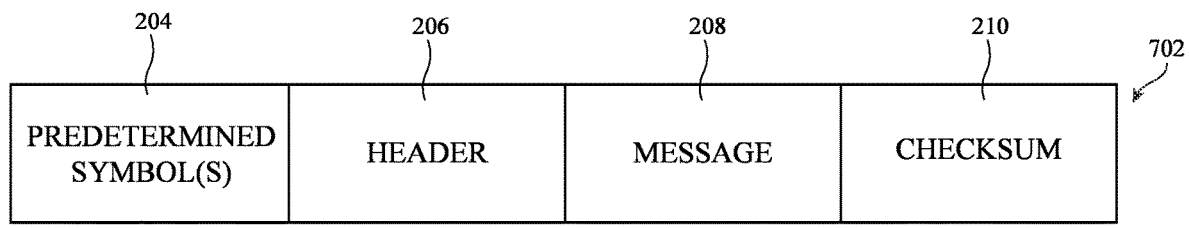
FIG. 7 is a diagram of an illustrative byte with one or more predetermined preamble bits in accordance with some embodiments.

To allow FSK decoder 602 to identify the actual transmission rate using information in the encoded data, FSK decoder 602 may synchronize operations to a detected transmission rate based on a known bit pattern in a received FSK byte. As shown in FIG. 7, each byte 702 transmitted by wireless power transmitting device 12 may have one or more predetermined symbols 204 at the beginning of the byte in addition to header 206, message 208, and checksum 210. Each portion of byte 702 may include any desired number of bits (e.g., one or more bits).

The predetermined symbol(s) 204 may sometimes be referred to as preamble 204 or predetermined preamble 204. The preamble 204 may be the same pattern of bits for each byte. FSK decoder 602 may know the bit pattern that is used for preamble 204 (e.g., the bit pattern may be stored in memory in FSK decoder 102).

FSK decoder 602 may periodically scan for the predetermined preamble at a first transmission rate (out of multiple permitted transmission rates). If the first transmission rate is found (e.g., when the predetermined preamble is identified at the first transmission rate), the FSK decoder may decode subsequent data using the first transmission rate. If the first transmission rate is not found (e.g., when the predetermined preamble is not identified at the first transmission rate), the FSK decoder may periodically scan for the predetermined preamble at a second transmission rate (out of multiple permitted transmission rates) that is different than the first transmission rate. This cycle may be repeated for different permitted transmission rates until the actual transmission rate is identified. Once the actual transmission rate is identified, FSK decoder 602 performs subsequent decoding using the actual transmission rate.

The predetermined preamble may be known (agreed upon) by the data transmitter and receiver (e.g., wireless power transmitting device 12 and wireless power receiving device 24) before data transmission occurs. The predetermined preamble may be agreed upon according to a protocol such as a published standard specification. Alternatively, the predetermined preamble may be agreed upon during a handshake phase and/or negotiation phase between the wireless power transmitting device 12 and the wireless power receiving device 24.

The predetermined preamble may be a series of the same bits (e.g., repeated '0' bits or repeated '1' bits). For example, the predetermined preamble may be four '0' bits. As another example, the predetermined preamble may be four '1' bits.

In some communications protocols, not every FSK byte includes a preamble 204. FSK decoder 602 may determine the transmission rate using the first received byte with the known preamble 204. The FSK decoder may then operate using the determined transmission rate until the transmission rate is determined to have changed. Therefore, if a subsequent byte is received that does not include a preamble, FSK decoder 602 will use the determined transmission rate from the previous byte to decode the byte that does not include a preamble.

In another possible arrangement, FSK decoder 602 may include a single channel that scans through multiple permitted transmission rates until a valid checksum is identified. For example, the FSK decoder may first operate using a first transmission rate (out of multiple permitted transmission rates). If operating at the first transmission rate results in decoded data with a valid checksum, the FSK decoder identifies the first transmission rate as the actual transmission rate and continues to decode data at the first transmission rate. If operating at the first transmission rate results in decoded data with an invalid checksum, the FSK decoder may switch to a second transmission rate. This cycle may be repeated until the actual transmission rate is identified.

The foregoing is merely illustrative and various modifications can be made to the described embodiments. The foregoing embodiments may be implemented individually or in any combination.

What is claimed is:

1. An electronic device comprising:
   wireless power transmission circuitry having a coil operable to transfer wireless power signals with an additional wireless charging device at a wireless power transfer frequency; and
   a frequency-shift keying decoder operable to decode data received from the additional wireless charging device during wireless power transmission, wherein:
      the data is represented using frequency-shift keying characteristics encoded into to the wireless power signal by the additional wireless charging device;
      the data is encoded at an actual transmission rate, selected by the additional wireless charging device, amongst a plurality of permitted transmission rates, wherein the permitted transmission rates are data transmission rates that are possible for transferring data while transferring wireless power signals at the wireless power transfer frequency; and
      the frequency-shift keying decoder is configured to identify the actual transmission rate using information in the encoded data.

2. The electronic device of claim 1, wherein the frequency-shift keying decoder comprises multiple channels each operating at a respective fixed transmission rate.

3. The electronic device of claim 1, wherein the frequency-shift keying decoder comprises a single decoder channel that operates at different transmission rates at different times.

4. The electronic device of claim 1, wherein the frequency-shift keying decoder is configured to, using a first decoder channel:
   decode the data at a first transmission rate;
   compare the data decoded at the first transmission rate against a checksum; and
   output the data decoded at the first transmission rate if the checksum is valid.

5. The electronic device of claim 4, wherein the frequency-shift keying decoder is configured to discard the data decoded at the first transmission rate if the checksum is invalid.

6. The electronic device of claim 4, wherein the frequency-shift keying decoder is configured to, using the first decoder channel and if the checksum is invalid:
 decode the data at a second transmission rate;
 compare the data decoded at the second transmission rate against an additional checksum; and
 output the data decoded at the second transmission rate if the additional checksum is valid.

7. The electronic device of claim 4, wherein the frequency-shift keying decoder is configured to, using a second decoder channel:
 decode the data at a second transmission rate;
 compare the data decoded at the second transmission rate against an additional checksum; and
 output the data decoded at the second transmission rate if the additional checksum is valid.

8. The electronic device of claim 1, wherein the frequency-shift keying decoder is configured to:
 periodically scan a decoder channel for a predetermined preamble at a first transmission rate; and
 in accordance with identifying the predetermined preamble in the data, decode subsequently received data using the first transmission rate.

9. The electronic device of claim 8, wherein the frequency-shift keying decoder is configured to:
 periodically scan the decoder channel for the predetermined preamble at a second transmission rate that is different than the first transmission rate.

10. The electronic device of claim 8, wherein the predetermined preamble is known by the electronic device and the additional wireless charging device before data transmission commences.

11. The electronic device of claim 8, wherein the predetermined preamble is a series of same bits.

12. The electronic device of claim 8, wherein the predetermined preamble is a series of 1 bits.

13. The electronic device of claim 8, wherein the predetermined preamble is a series of 0 bits.

14. A method of operating an electronic device comprising wireless power transmission circuitry having a coil and a frequency-shift keying decoder, the method comprising:
 using the coil, transferring wireless power signals with an additional wireless charging device at a wireless power transfer frequency; and
 using the frequency-shift keying decoder:
  decoding data received from the additional wireless charging device during wireless power transmission, wherein:
   the data is represented using frequency-shift keying characteristics encoded into to the wireless power signal by the additional wireless charging device; and
   the data is encoded at an actual transmission rate, selected by the additional wireless charging device, amongst a plurality of permitted transmission rates, wherein the permitted transmission rates are data transmission rates that are possible for transferring data while transferring wireless power signals at the wireless power transfer frequency; and
  identifying the actual transmission rate using information in the encoded data.

15. The method of claim 14, further comprising:
 using a first decoder channel in the frequency-shift keying decoder:
  decoding the data at a first transmission rate;
  comparing the data decoded at the first transmission rate against a checksum; and
  outputting the data decoded at the first transmission rate if the checksum is valid.

16. The method of claim 14, further comprising:
 using the frequency-shift keying decoder:
  periodically scanning a decoder channel for a predetermined preamble at a first transmission rate; and
  in accordance with identifying the predetermined preamble in the data, decoding subsequently received data using the first transmission rate.

17. The method of claim 16, wherein the predetermined preamble is a series of same bits.

18. A method of operating a frequency-shift keying decoder in an electronic device, the method comprising:
 decoding data received from an additional wireless charging device during wireless power transmission at a wireless power transfer frequency, wherein:
  the data is represented using frequency-shift keying characteristics encoded into a wireless power signal by the additional wireless charging device; and
  the data is encoded at an actual transmission rate, selected by the additional wireless charging device, amongst a plurality of permitted transmission rates, wherein the permitted transmission rates are data transmission rates that are possible for transferring data while transferring wireless power signals at the wireless power transfer frequency; and
 identifying the actual transmission rate using information in the encoded data.

19. The method of claim 18, further comprising:
 using a first decoder channel in the frequency-shift keying decoder:
  decoding the data at a first transmission rate;
  comparing the data decoded at the first transmission rate against a checksum; and
  outputting the data decoded at the first transmission rate if the checksum is valid.

20. The method of claim 18, further comprising:
 periodically scanning a decoder channel for a predetermined preamble at a first transmission rate; and
 in accordance with identifying the predetermined preamble in the data, decoding subsequently received data using the first transmission rate.

* * * * *

UNITED STATES PATENT AND TRADEMARK OFFICE
CERTIFICATE OF CORRECTION

| | | |
|---|---|---|
| PATENT NO. | : 12,401,232 B2 | Page 1 of 1 |
| APPLICATION NO. | : 17/883401 | |
| DATED | : August 26, 2025 | |
| INVENTOR(S) | : Stephen C. Terry and Zaid A. AbuKhalaf | |

It is certified that error appears in the above-identified patent and that said Letters Patent is hereby corrected as shown below:

In the Claims

Column 11, Line 54, "encoded into to" should read -- encoded into --

Signed and Sealed this
Seventh Day of October, 2025

John A. Squires
*Director of the United States Patent and Trademark Office*